US010064151B2

(12) United States Patent
Yae

(10) Patent No.: US 10,064,151 B2
(45) Date of Patent: Aug. 28, 2018

(54) HEAD UNIT OF VEHICLE, METHOD FOR CONTROLLING THE HEAD UNIT, AND TRANSMISSION/RECEPTION SYNCHRONIZATION SYSTEM BETWEEN HETEROGENEOUS DEVICES

(71) Applicant: HYUNDAI MOTOR COMPANY, Seoul (KR)

(72) Inventor: Seong Soo Yae, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 347 days.

(21) Appl. No.: 14/958,580

(22) Filed: Dec. 3, 2015

(65) Prior Publication Data
US 2016/0278035 A1 Sep. 22, 2016

(30) Foreign Application Priority Data
Mar. 20, 2015 (KR) .......................... 10-2015-0038804

(51) Int. Cl.
| H04W 56/00 | (2009.01) |
| H04B 1/3822 | (2015.01) |
| H04W 4/80 | (2018.01) |
| H04W 84/18 | (2009.01) |
| H04W 88/06 | (2009.01) |

(52) U.S. Cl.
CPC ...... H04W 56/0025 (2013.01); H04B 1/3822 (2013.01); H04W 4/80 (2018.02); H04W 84/18 (2013.01); H04W 88/06 (2013.01)

(58) Field of Classification Search
CPC . H04W 56/0025; H04W 4/008; H04W 84/18; H04W 88/06; H04B 1/3822
See application file for complete search history.

(56) References Cited

U.S. PATENT DOCUMENTS

| 7,454,171 B2 | 11/2008 | Palin et al. |
| 7,899,396 B2 | 3/2011 | Meylan et al. |
| 2009/0285167 A1 | 11/2009 | Hirsch et al. |
| 2011/0096758 A1 | 4/2011 | Ko et al. |
| 2015/0111610 A1* | 4/2015 | Hwang ............. H04W 72/1215 455/553.1 |

(Continued)

FOREIGN PATENT DOCUMENTS

| JP | 2006-521714 A | 9/2006 |
| JP | 2009-005195 A | 1/2009 |

(Continued)

*Primary Examiner* — Habte Mered
(74) *Attorney, Agent, or Firm* — McDermott Will & Emery LLP

(57) ABSTRACT

A head unit of a vehicle may include an antenna, a combo module supporting first communication and second communication using the same frequency through the antenna, and a controller for controlling the combo module to be switched to one of a first communication mode and a second communication mode. If the head unit is connected to an external device including a combo module supporting the first communication and the second communication simultaneously in the first communication mode and the second communication mode, the controller may synchronize a cycle of a first communication window and a second communication window with the external device. As such, device stability and efficiency may be improved.

17 Claims, 4 Drawing Sheets

(56) References Cited

U.S. PATENT DOCUMENTS

2016/0234696 A1\* 8/2016 Looker .................... H04B 1/44
2017/0311359 A1\* 10/2017 Cho ...................... H04W 76/02

FOREIGN PATENT DOCUMENTS

| JP | 2010-278764 A | 12/2010 |
| KR | 10-2009-0091635 A | 8/2009 |
| KR | 10-2010-0013287 A | 2/2010 |
| KR | 10-2010-0028453 A | 3/2010 |
| KR | 10-2011-0076575 A | 7/2011 |

\* cited by examiner

HEAD UNIT OF VEHICLE, METHOD FOR CONTROLLING THE HEAD UNIT, AND TRANSMISSION/RECEPTION SYNCHRONIZATION SYSTEM BETWEEN HETEROGENEOUS DEVICES

CROSS-REFERENCE TO RELATED APPLICATION

This application claims priority to and the benefit of Korean Patent Application No. P10-2015-0038804, filed on Mar. 20, 2015 in the Korean Intellectual Property Office, the disclosure which is hereby incorporated by reference as if fully set forth herein.

TECHNICAL FIELD

The present disclosure relates to a head unit of a vehicle, a method for controlling the head unit, and a transmission/reception synchronization system between heterogeneous devices and, more particularly, to a head unit of a vehicle for performing different types of communication with an external device using the same frequency, a method for controlling the head unit, and a transmission/reception synchronization system between heterogeneous devices.

BACKGROUND

Due to rapid development of electronic control technologies, a variety of devices of a vehicle which operate in mechanical manner can also be driven in electrical manner for convenience of a driver and safety in driving, and a vehicle system is continuously upgraded and advanced.

In addition, development of communication technology between mobile devices leads to development of communication technologies between a vehicle and a mobile device and between vehicles. A vehicle can communicate with an external device using WiFi, Bluetooth, or mobile communication technology.

Meanwhile, a mobile device and a vehicle device currently include Bluetooth/WiFi combo modules. The Bluetooth/WiFi combo module includes a module for Bluetooth communication and a module for WiFi communication, and the Bluetooth module and the WiFi module share an antenna.

According to the related art, if Bluetooth connection and WiFi connection are simultaneously established between devices including Bluetooth/WiFi combo modules, problems such as data loss and disconnection occur.

Furthermore, in this case, a Bluetooth module and a WiFi module do not share an antenna.

As such, when different types of connection are established between the two devices using the same frequency, a solution to the above problems is required.

RELATED ART DOCUMENT

Patent Document

KR 10-2014-0052423

SUMMARY

Accordingly, the present invention is directed to a head unit of a vehicle, a method for controlling the head unit, and a transmission/reception synchronization system between heterogeneous devices, which substantially obviate one or more problems due to limitations and disadvantages of the related art.

An object of the present invention is to provide a head unit of a vehicle for stably performing Bluetooth communication and WiFi communication with an external device including a Bluetooth/WiFi combo module, a method for controlling the head unit, and a transmission/reception synchronization system between heterogeneous devices.

Another object of the present invention is to provide a head unit of a vehicle for controlling WiFi connection not to fail when Bluetooth connection is established first and then a WiFi connection attempt event occurs, and a method for controlling the head unit.

A further object of the present invention is to provide a head unit of a vehicle capable of preventing data loss and connection failure when Bluetooth connection and WiFi connection are established between devices including Bluetooth/WiFi combo modules, and a method for controlling the head unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head unit of a vehicle may include an antenna, a combo module supporting first communication and second communication using the same frequency through the antenna, and a controller for controlling the combo module to be switched to one of a first communication mode and a second communication mode. If the head unit is connected to an external device including a combo module supporting the first communication and the second communication simultaneously in the first communication mode and the second communication mode, the controller may synchronize a cycle of a first communication window and a second communication window with the external device. As such, device stability and efficiency may be improved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
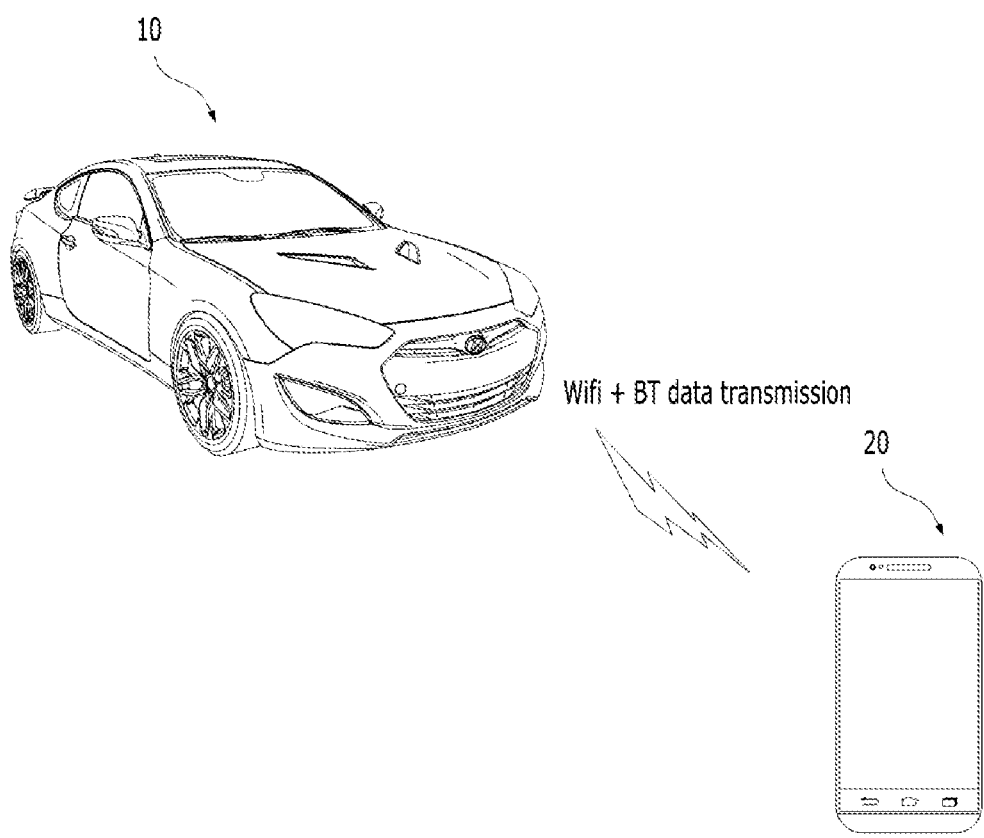
FIG. 1 is a schematic diagram showing communication between a vehicle and a mobile device according to an embodiment of the present invention.

Reference will now be made in detail to the preferred embodiments of the present invention, examples of which are illustrated in the accompanying drawings. Like reference numerals in the drawings denote like elements and repeated descriptions thereof will be omitted. The suffixes "module", "---er/or" and "unit" of elements herein are used for convenience of description and thus can be used interchangeably and do not have any distinguishable meanings or functions. In the following description of the present invention, a detailed description of known functions and configurations incorporated herein will be omitted when it may make the subject matter of the present invention unclear. It should be understood that there is no intent to limit exemplary embodiments of the invention to the particular forms disclosed, rather, exemplary embodiments of the invention are to cover all modifications, equivalents, and alternatives falling within the spirit and scope of the invention.

The terms "first", "second", and the like, herein do not denote any order, quantity, or importance, but rather are used to distinguish one element from another.

It will be understood that when an element is referred to as being "connected to" or "coupled to" another element, it can be directly connected or coupled to the other element or intervening elements may be present therebetween. In contrast, when an element is referred to as being "directly connected to" or "directly coupled to" another element, no intervening elements are present.

As used herein, the singular forms "a", "an" and "the" are intended to include the plural forms as well, unless the context clearly indicates otherwise.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a schematic diagram showing communication between a vehicle 10 and a mobile device 20 according to an embodiment of the present invention.

Referring to FIG. 1, the vehicle 10 includes a head unit (not shown) therein. The head unit may provide audio and video services to a user inside the vehicle 10, and provide navigation services to the user. In addition, the head unit may perform Bluetooth or WiFi communication with an external device (e.g., the mobile device 20), and receive telematics services in association with a telematics module.

The head unit according to the present invention includes a Bluetooth/WiFi combo module. The Bluetooth/WiFi combo module uses the same frequency (e.g., 2.4 GHz), and is a module necessary when the head unit performs Bluetooth communication and/or WiFi communication.

If it is assumed that the mobile device 20 also includes a Bluetooth/WiFi module, the head unit may be connected to the mobile device 20 through Bluetooth and WiFi.

In this case, a time allocated by the head unit for Bluetooth communication may be referred to as a Bluetooth window, and a time allocated for WiFi communication may be referred to as a WiFi window. Likewise, a time allocated by the mobile device 20 for Bluetooth communication may be referred to as a Bluetooth window, and a time allocated for WiFi communication may be referred to as a WiFi window.

At this time, the head unit and the mobile device 20 may synchronize a cycle of the Bluetooth window and the WiFi window for communication therebetween. Then, the head unit may transmit and receive WiFi data to and from the mobile device 20 during the WiFi window, and transmit and receive Bluetooth data during the Bluetooth window.

As described above, since a cycle of a WiFi window and a Bluetooth window is synchronized between heterogeneous devices, data loss or disconnection due to frequency interference may be prevented.

Figure 2:
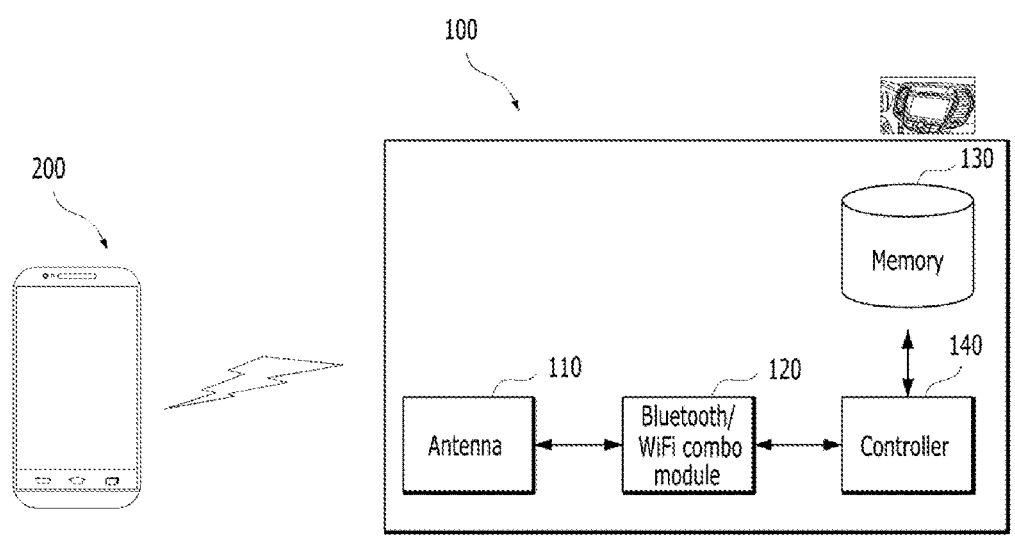
FIG. 2 is a block diagram of a head unit of a vehicle which communicates with an external device.

FIG. 2 is a block diagram of a head unit 100 of a vehicle which communicates with an external device 200.

Referring to FIG. 2, the head unit 100 may include an antenna 110, a Bluetooth/WiFi combo module 120, a memory 130, and a controller 140.

The head unit 100 may perform Bluetooth communication and WiFi communication with the external device 200. The head unit 100 may include at least one antenna 10. This specification mainly describes the antenna 110 used commonly for Bluetooth communication and WiFi communication.

For transmission, the antenna 110 may emit an alternating current (AC) voltage modulated by a transmitter, into the air. On the contrary, for reception, the antenna 110 may convert an electromagnetic wave into an AC voltage measured by a receiver. The head unit 100 may wirelessly communicate with the external device 200 through the antenna 110.

The Bluetooth/WiFi combo module 120 is a combo module in which Bluetooth and WiFi modules are mounted on a single chip. The Bluetooth/WiFi combo module 120 commonly uses the antenna 110.

In addition, the controller 140 may perform Bluetooth communication with the external device 200 through the Bluetooth module, and perform WiFi communication with the external device 200 through the WiFi module.

The Bluetooth/WiFi combo module 120 may communicate with the external device 200 using the same frequency through the antenna 110.

The memory 130 is controlled by the controller 140. The memory 130 may include at least one storage medium selected among a flash memory, a hard disk memory, a multimedia card micro memory, a card memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The controller 140 controls overall operation of the head unit 100 of the vehicle.

The controller 140 may control the Bluetooth/WiFi combo module 120 to be switched to one of a Bluetooth mode and a WiFi mode. The controller 140 may control the Bluetooth/WiFi combo module 120 to operate in the Bluetooth mode when the head unit 100 performs Bluetooth communication with the external device 200, and control the Bluetooth/WiFi combo module 120 to operate in the WiFi mode when the head unit 100 performs WiFi communication with the external device 200.

If Bluetooth connection and WiFi connection are simultaneously established to the external device 200, the controller 140 may synchronize a frequency cycle for Bluetooth communication and WiFi communication with the external device 200. A detailed description thereof will be given below.

Figure 3:
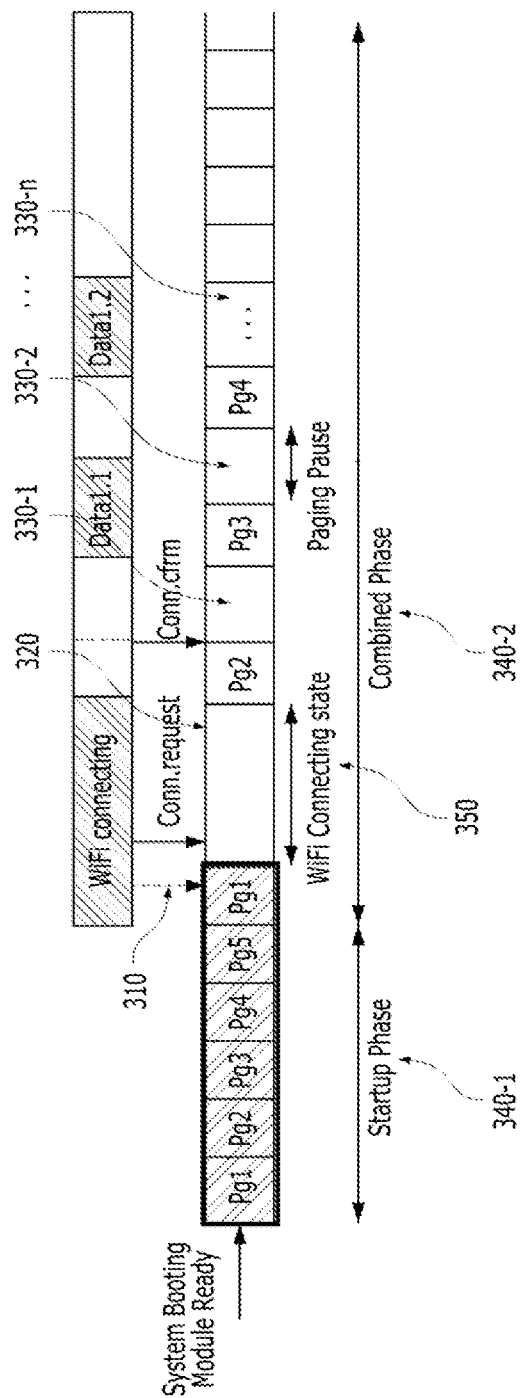
FIG. 3 is a diagram showing a process for establishing Bluetooth connection and WiFi connection by the head unit according to an embodiment of the present invention.

FIG. 3 is a diagram showing a process for establishing Bluetooth connection and WiFi connection by the head unit 100 according to an embodiment of the present invention.

The following description assumes that the controller 140 establishes Bluetooth connection using the Bluetooth module of the Bluetooth/WiFi combo module 120, and then establishes WiFi connection using the WiFi module. Although WiFi connection may be established and then Bluetooth connection may be established, Bluetooth is used more frequently in the vehicle and thus the description is focused on the case in which Bluetooth connection is established first.

Initially, once a system booting module is ready, the controller 140 may prepare Bluetooth connection. The controller 140 may allocate a time for Bluetooth connection from page 1 Pg1 to page 5 Pg5. Here, connection to an external device may be established per page slot. At this time, connection to a Bluetooth device means that pairing with an external device is achieved and thus services are enabled. This specification assumes that the controller 140 is configured to discover 5 devices in a startup phase 340-1.

The controller 140 may attempt connection to an external device during cycle 1, and then allocate an empty slot (paging pause, for example, intervals 320, 330-1, 330-2, . . . , 330-n between pages) in cycle 2. At this time, the controller 140 may wait for another communication event in the empty slot period.

In this case, if a WiFi connection event is received, intervals 310 and 320 for WiFi connection may be provided.

According to the present invention, if a WiFi connection event occurs, a WiFi connecting state 350 may be provided and thus Bluetooth connection and WiFi connection may be stably provided. The controller 140 receives Bluetooth data for each of the pages Pg1 to Pg5 after cycle 2. If WiFi connection is established together with Bluetooth connection, the controller 140 may control the Bluetooth/WiFi combo module 120 to use the paging pause period to transmit and receive WiFi data.

In addition, if a WiFi connection attempt event is received while Bluetooth connection is being attempted, the controller 140 may control the Bluetooth/WiFi combo module 120 to provide time intervals for Bluetooth connection and WiFi connection.

As such, the controller 140 may sequentially establish Bluetooth connection and WiFi connection.

As described above, the controller 140 may establish Bluetooth connection and then establish WiFi connection, and may allocate a paging pause period for WiFi connection while Bluetooth connection is being established.

Here, if only Bluetooth connection or WiFi connection is established, the controller 140 may control the Bluetooth/WiFi combo module 120 to perform general Bluetooth communication or WiFi communication.

Figure 4:
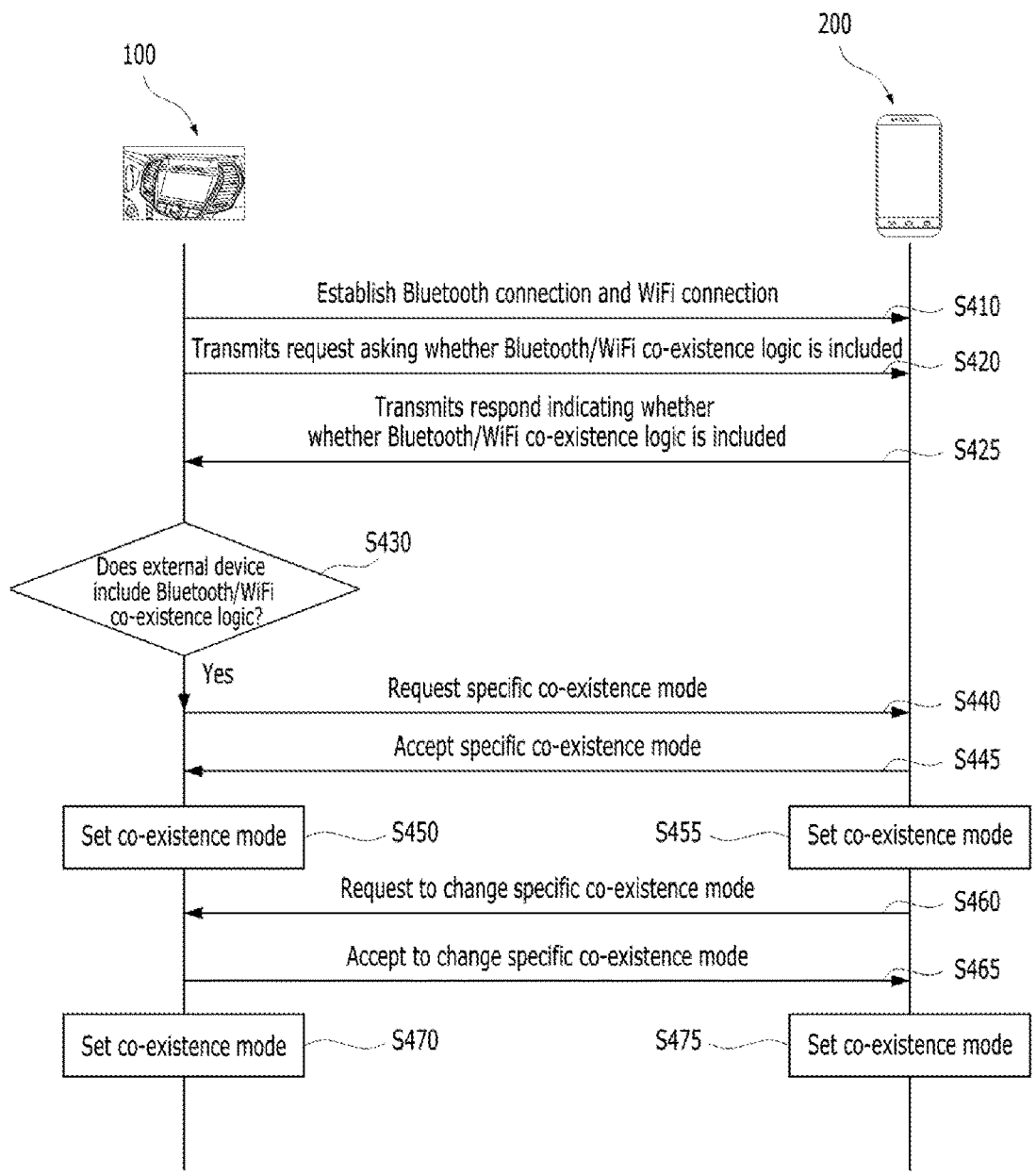
FIG. 4 is a flowchart of a method for setting a co-existence mode between the external device and the head unit including Bluetooth/WiFi combo modules according to an embodiment of the present invention.

FIG. 4 is a flowchart of a method for setting a co-existence mode between the external device 200 and the head unit 100 including Bluetooth/WiFi combo modules according to an embodiment of the present invention.

Initially, the head unit 100 establishes Bluetooth connection and WiFi connection to the external device 200 (S410).

A method for performing Bluetooth communication and WiFi communication between the head unit 100 and the external device 200 has been described above in relation to FIG. 3, and thus is not described here.

Then, the head unit 100 transmits a request asking whether the external device 200 includes Bluetooth/WiFi co-existence logic, to the external device 200 (S420).

Here, the Bluetooth/WiFi co-existence logic may refer to logic capable of adjusting time slices of a Bluetooth window and a WiFi window if a Bluetooth/WiFi combo module is present.

Then, the external device 200 transmits a response indicating whether the external device 200 includes the Bluetooth/WiFi co-existence logic, to the head unit 100 (S425).

In this case, if the external device 200 includes the Bluetooth/WiFi co-existence logic (S430), the head unit 100 may request a specific co-existence mode to the external device 200 (S440).

As such, the head unit 100 may determine whether the external device 200 is capable of setting the co-existence mode.

The head unit 100 may set a co-existence mode including information about a time and interval for allocating a Bluetooth window, and a time and interval for allocating a WiFi window according to the necessity of the head unit 100. Here, the Bluetooth window may be a time allocated by the head unit 100 for Bluetooth communication, and the WiFi window may be a time allocated by the head unit 100 for WiFi communication.

Then, the external device 200 transmits a response indicating whether to accept the specific co-existence mode, to the head unit 100 (S445).

As described above, the head unit 100 and the external device 200 may negotiate with each other for the co-existence mode. Although the head unit 100 has triggered to set the co-existence mode in the above description (S450), the external device 200 including the Bluetooth/WiFi combo module may also trigger to set the co-existence mode (S455).

Table 1 shows an example of co-existence modes.

TABLE 1

| Mode | BT | WiFi | Determination Condition |
| --- | --- | --- | --- |
| Mode 1 | Time occupation of 50% | Time occupation of 50% | For normal case |
| Mode 2 | Time occupation of 70% | Time occupation of 30% | For Bluetooth streaming |
| Mode 3 | Time occupation of 30% | Time occupation of 70% | For large WiFi streaming |
| Mode 4 | A request node requests to use 100% | | For updating, etc. |

The above table is merely exemplary, and the head unit 100 and the external device 200 may set an appropriate co-existence mode through negotiation (S460, S465, S470, and S475).

Here, the head unit 100 may configure communication windows based on the amounts of use of Bluetooth communication and WiFi communication. For example, if Bluetooth communication is used more than WiFi communication, the head unit 100 may configure the Bluetooth window to be larger than the WiFi window. Otherwise, if WiFi communication is used more, the head unit 100 may configure the WiFi window to be larger than the Bluetooth window.

The head unit 100 may configure a frequency cycle to correspond to the set co-existence mode. Particularly, the head unit 100 may synchronize the frequency cycle of the Bluetooth window and the WiFi window of the external device 200.

As described above, the head unit 100 transmits and receives only Bluetooth data to and from the external device 200 during the Bluetooth window, and transmits and receives only WiFi data during the WiFi window. As such, the head unit 100 may transmit and receive Bluetooth data while the external device 200 may transmit and receive WiFi data, and thus a conventional problem such as data loss or disconnection may be solved.

Although the above description of this specification has been focused on devices including Bluetooth/WiFi combo modules, such devices are merely exemplary and the present invention is also applicable to frequency interference avoidance between devices performing different types of communication using the same frequency.

As is apparent from the above description, according to various embodiments of the present invention, a head unit of a vehicle may stably perform Bluetooth communication and WiFi communication with an external device including a Bluetooth/WiFi combo module, and thus device stability may be improved.

In addition, when Bluetooth connection and WiFi connection are simultaneously established, a problem such as data loss or connection may be solved, and thus device efficiency may be improved.

It will be appreciated by persons skilled in the art that the effects that could be achieved through the present invention are not limited to what has been particularly described hereinabove and other advantages of the present invention will be more clearly understood from the following detailed description taken in conjunction with the accompanying drawings.

The present invention can also be embodied as computer-readable code on a computer-readable recording medium. The computer-readable recording medium is any data storage device that can store data which can be thereafter read by a computer system. Examples of the computer-readable recording medium may include a hard disk drive (HDD), a solid state disk (SSD), a silicon disk drive (SDD), ROM, RAM, a CD-ROM, a magnetic tape, a floppy disk, and an optical data storage device. In addition, the computer-readable recording medium includes a carrier wave (e.g., data transmission over the Internet). Accordingly, the above detailed description is not to be construed as limiting the present invention in all aspects and be considered by way of example. The scope of the present invention should be determined by reasonable interpretation of the accompanying claims and all equivalent modifications made without departing from the present invention should be included in the following claims.

What is claimed is:

1. A head unit of a vehicle, the head unit comprising:
   an antenna;
   a combo wireless module supporting first communication and second communication using the same frequency through the antenna; and
   a controller for controlling the combo wireless module to be switched to one of a first communication mode corresponding to the first communication and a second communication mode corresponding to the second communication,
   wherein, if the head unit is connected to an external device comprising a combo wireless module supporting the first communication and the second communication simultaneously in the first communication mode and the second communication mode, the controller synchronizes a cycle of a first communication window to perform the first communication and a second communication window to perform the second communication with the external device, and
   wherein, if the external device is capable of setting a co-existence mode, the head unit sets a ratio of the first communication window to the second communication window based on a preset rule.

2. The head unit according to claim 1, wherein the first communication is Bluetooth communication, and wherein the second communication is WiFi communication.

3. The head unit according to claim 1, wherein, if an event for attempting second communication connection is received while first communication connection is being attempted, the controller controls the combo wireless module to provide intervals for the first communication connection and the second communication connection.

4. The head unit according to claim 1, wherein, if an event for attempting second communication connection is received after first communication connection is established, the controller controls the combo wireless module to provide an interval for the second communication connection.

5. The head unit according to claim 1, wherein the controller sequentially establishes first communication connection and second communication connection to the external device.

6. The head unit according to claim 1, wherein, if only one communication between the first communication and the second communication is supported with the external device comprising the combo wireless module, the controller performs the one communication with the external device.

7. The head unit according to claim 1, wherein, if the external device is capable of setting the co-existence mode, the controller sets the ratio of the first communication window to the second communication window based on amounts of use.

8. The head unit according to claim 7, wherein the controller synchronizes a frequency cycle of the first communication and the second communication with the external device based on the set ratio of the first communication window to the second communication window.

9. The head unit according to claim 7, wherein the controller allocates the first communication window to be equal to the second communication window.

10. The head unit according to claim 7, wherein the controller allocates the first communication window to be larger than the second communication window.

11. The head unit according to claim 7, wherein the controller allocates the first communication window to be smaller than the second communication window.

12. The head unit according to claim 1, wherein the first communication and the second communication use 2.4 GHz.

13. A method for controlling a head unit of a vehicle, the head unit comprising a first combo wireless module for performing first communication or second communication, the method comprising:
   establishing first communication connection and second communication connection to an external device comprising a second combo wireless module;
   asking the external device whether the external device is capable of supporting a co-existence mode;
   synchronizing a frequency cycle of the first communication and the second communication with the external device; and
   setting a ratio of the first communication window to the second communication window based on a preset rule if the external device is capable of setting a co-existence mode.

14. The method according to claim 13, wherein the first communication is Bluetooth communication, and wherein the second communication is WiFi communication.

15. The method according to claim 13, wherein the establishing of the first communication connection and the second communication connection comprises establishing the first communication connection first and then establishing the second communication connection.

16. The method according to claim 13, wherein the establishing of the first communication connection and the second communication connection comprises providing an interval for the second communication connection if an event for attempting the second communication connection is received after the first communication connection is established.

17. A transmission/reception synchronization system between heterogeneous devices, the system comprising:

a head unit of a vehicle, the head unit comprising a first combo wireless module for performing first communication and second communication using the same frequency; and an external device comprising a second combo wireless module for performing the first communication and the second communication with the head unit, wherein the head unit synchronizes a cycle of a first communication window for performing the first communication and a second communication window for performing the second communication with the external device, wherein, if the external device is capable of setting a co-existence mode, the head unit sets a ratio of the first communication window to the second communication window based on a preset rule.

* * * * *